United States Patent Office 3,806,368
Patented Apr. 23, 1974

3,806,368
ZINC BROMIDE BATTERY
Donald L. Maricle, Londonderry, N.H., and Michael A. George, Dedham, Mass., assignors to The Zito Company, Inc., Derry, New Hampshire
Filed Nov. 14, 1972, Ser. No. 306,211
Int. Cl. H01m 43/06
U.S. Cl. 136—6 R          10 Claims

ABSTRACT OF THE DISCLOSURE

A secondary battery is provided having an aqueous electrolyte containing dissolved zinc bromide in low molarity which is sufficient to support the major part but not all of a full charge, and ot least one additional dissolved zinc salt having an anion which is non-reactive with bromine under battery operating conditions and is either non-oxidizable, or more difficultly oxidizable, than bromide ion at the cathode potential under operating conditions, the salt being in sufficient amount so that the bromide ion is substantially less than twice the amount of zinc ion. The cathode has a layer capable of adsorbing substantially all the bromine produced at the cathode during charge.

BACKGROUND OF THE INVENTION

Field of the invention

This invention relates to secondary batteries, and particularly to such batteries having a zinc bromide aqueous electrolyte.

Description of the prior art

U.S. Pat. 3,640,771, Feb. 8, 1972, discloses a metal bromide aqueous electrolyte battery having a limited concentration of the metal bromide in solution in the electrolyte such that when the battery is charged, the remaining dissolved metal bromide salt and the total free bromine in the electrolyte are in minor quantity, the remaining free bromine being retained in a bromine-adsorbent layer provided at the cathode.

Tests with batteries made in accordance with the patent using zinc bromide solution of such limited molarity have shown that they have certain advantages over comparable batteries wherein the zinc bromide molarity is not so limited. As stated in the patent, such limited molarity zinc bromide batteries have advantages over the conventional non-limited batteries in that low bromide molarity at the end of charge reduces the availability of free polybromides to attack and degrade the zinc plating on the anode, and there is a voltage inflection at the end of charge with an accompanying increased end of charge voltage, which voltage inflection can be utilized to signal for, and so cause, end of the charge cycle. However, such advantages are accompanied with certain disadvantages as compared with the unlimited conventional batteries, chief among which are that the zinc plating on the anode is not as good as it should be, and the batteries suffer a comparative performance depreciation (i.e., less ampere hours output as compared with input).

SUMMARY OF THE INVENTION

An object of this invention is to provide improved zinc bromide batteries of limited bromide molarity which have the advantages of batteries according to said patent without the attendant disadvantages mentioned above.

Another object is to provide such batteries which not only do not suffer significant performance depreciation as compared with conventional unlimited batteries, but usually actually show a gain therein as well as increased end of charge voltage.

Still another object is to provide such batteries which are self-limiting in the charge current they will receive toward the end of charge so that they may safely be charged with conventional constant voltage chargers.

It has been discovered that the objects of this invention can be achieved by adding to the electrolyte of a zinc bromide limited battery such, for example, as disclosed in said patent, a sufficient quantity of one or more of certain zinc salts other than zinc bromide. The zinc salts useful for the purpose are soluble in the aqueous electrolyte, have an anion which is not oxidizable or more difficultly oxidizable than bromide ion at the potentials reached by the cathode up to full charge and are non-reactive with bromine under battery operating conditions. Examples of such useful non-oxidizable zinc salts are zinc sulfate, zinc acetate, zinc trifluoro acetate, zinc nitrate, zinc citrate and zinc tetra-fluoroborate, zinc sulfate being presently preferred, while zinc chloride is an example of the other type of useful zinc salts. The amount of such salt added is sufficient to provide a zinc ion concentration in the electrolyte substantially more than half that of the bromide ion.

According to the invention, the zinc bromide content of the electrolyte is limited to an amount that will not support full charge of the battery by bromide oxidafion at the cathode, although sufficient to support the major part of the charge. Also, as in said patent, a bromide-adsorbent layer is provided at the cathode, preferably having a capacity for adsorbing at least half its weight of molecular bromine formed at the cathode during the charge cycle and such that when the battery is in the fully charged state nearly all if not all the molecular bromine generated at the cathode has been adsorbed by the layer.

Since the amount of bromide ion present in the electrolyte is not sufficient to support full charge of the battery by bromide oxidation at the cathode, toward the end of the charge cycle, the bromide ion available to the cathode is so depleted that the cathode potential controlling reaction becomes the more difficult one of oxygen generation from the water of the electrolyte ($2H_2O \rightarrow O_2 + 2H^+ + 2e^-$) if the additional zinc salt is of the non-oxidizable anion type. If the additional salt is of the more difficult to oxidize anion type, the cathode potential controlling reaction becomes the more difficult oxidation of it, or oxygen generation from water or both. By "more difficult" is meant that a higher anodic potential is required for the oxygen generation or oxidation referred to than for the oxidation of bromide ion. On the other hand, zinc ion continues available and plates out on the anode throughout the charge, forming excellent plating which is better than that of conventional zinc bromide batteries in lack of deterioration by free bromine attack and better in that it is thicker and more uniform than that obtained in batteries according to the aforesaid patent even with brighteners included. Deterioration of the zinc plating by free bromine attack is minimized by the low bromide ion content of the solution toward the end of charge, which reduces the solubility of bromine in the electrolyte and hence reduces its availability to attack the plating.

Batteries according to this invention characteristically show a gain both in end of charge voltage and performance as compared with conventional zinc bromide batteries; whereas, in batteries according to the aforesaid patent, gain in end of charge voltage is characteristically accompanied by a loss in performance as compared with such conventional batteries. Batteries according to this invention are self-limiting in the amount of charge current they will accept when charged with a constant voltage; whereas, the conventional batteries are not. Also, batteries according to this invention have increased charge acceptance over the conventional batteries so that greater Ah inputs and hence greater Ah outputs are achieved.

Figure 1:
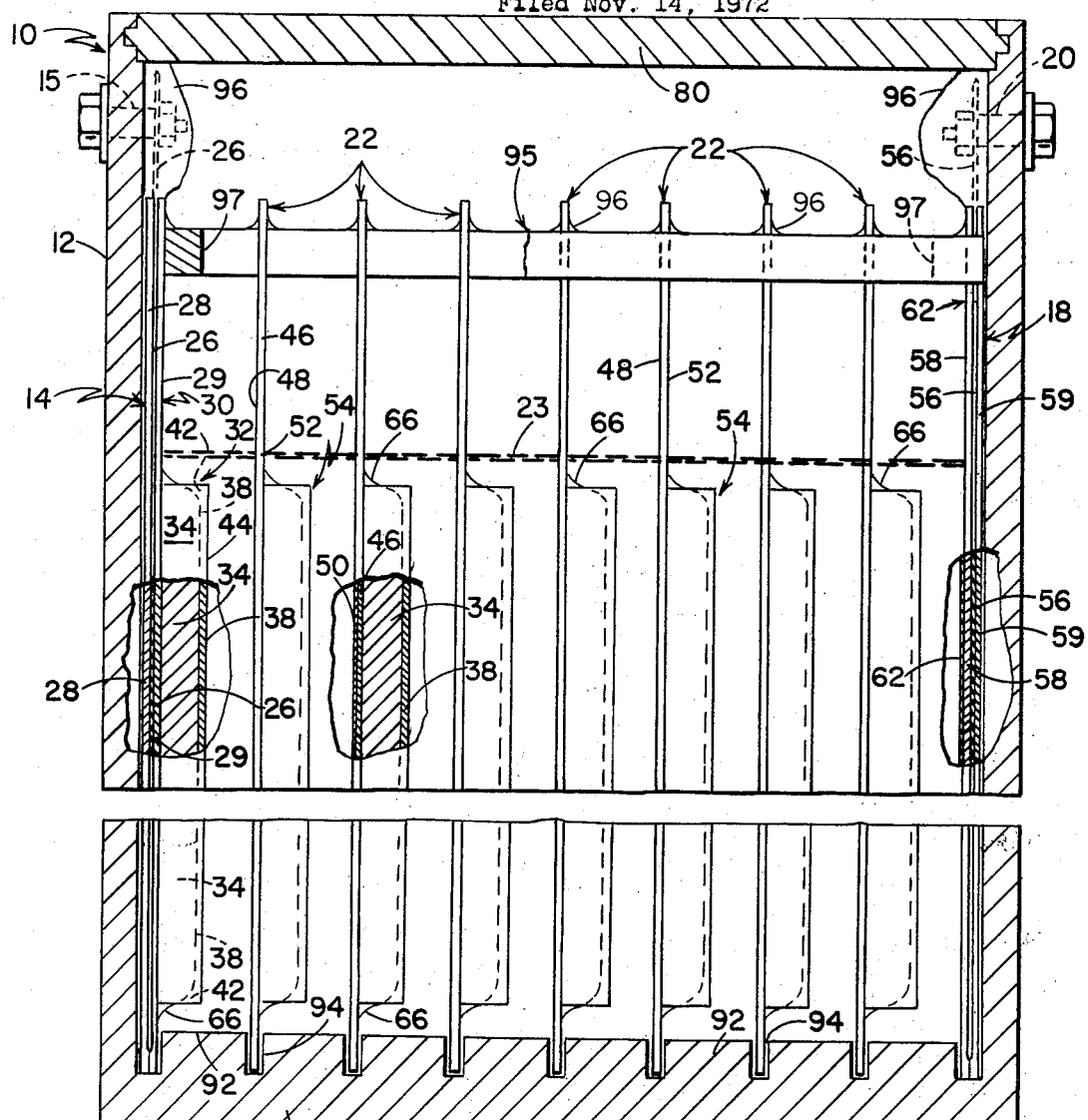
FIG. 1 is a side elevation view of a zinc bromide battery embodying the present invention broken away between top and bottom and with a side broken away to show interior construction, broken out portions of certain electrodes being shown in cross-section to illustrate interior construction.

The battery shown in FIG. 1 has an electrode construction according to U.S. application Ser. No. 112,254 filed by Ralph Zito on Feb. 3, 1971, now U.S. Pat. No. 3,719,526 and assigned to the assignee of the present application. It is preferred to utilize this construction for the present invention rather than that specifically shown and described in aforesaid Pat. No. 3,640,771.

FIG. 1 shows the zinc bromide battery 10 encased in a housing 12 which may be made of polyethylene, the side of housing 12 having been broken away to expose the interior of the battery. The battery has a terminal cathode 14 electrically connected to a cathode terminal screw 15 which extends through the housing 12, a terminal anode 18 at its other end which is electrically connected to an anode terminal screw 20 which also extends through the housing 12, and a plurality (7) of intermediate or composite electrodes 22, all arranged generally in parallel and spaced apart from one another, e.g., by about 90 mils. The liquid electrolyte medium 23 consists of an aqueous solution of zinc bromide and certain zinc salt or salts as hereinafter particularly described.

The terminal cathode 14 has a copper screen 26, the major portion of which is sandwiched between two bromine-inert and bromine-impermeable electroconductive layers 28, 29, each of which may be formed of a mixture of 50% by weight of electroconductive graphite particles (e.g., Dixon graphite 1112) bonded together by 50% by weight of poly (vinylidene fluoride) (e.g., "Kynar" 301) particles, the graphite and bonding agent being bonded together under heat and pressure to form an integral electroconductive layer. Each layer 28, 29 is capable of conducting electricity across its thickness from its exposed face through copper screen 26 and has a thickness of about 25 mils. The layers 28, 29 are bonded to one another through the openings in copper screen 26.

Firmly secured to the exposed face 30 of layer 29, which has an exposed surface area, for example, of about 81 (9 in. x 9 in.) square inches is a bromine entrapment structure 32, which consists of an interior bromine adsorbent layer 34 and a surface layer 38 firmly secured to the front exposed face of adsorbent layer 34. Adsorbent layer 34 is formed of at least 90% by weight of bromine adsorbent activated carbon particles (e.g., Barneby Cheney UU grade) and the remainder of a polyethylene bonding agent (e.g., USI "Microthene" FN510) effective to bond the carbon particles into an integral adsorbent mass. The layer 34 has a thickness on the order of about 120 mils over most of its area, and a somewhat reduced thickness at its edges.

Surface layer 38 is about 25 mils thick over most of its area, and of somewhat greater thickness at its edges 42, and is formed of at least about 90% by weight of electrically non-conductive particles such as diatomaceous earth, e.g., "Celite" 560, bonded together into an integral non-conductive mass by a bonding agent which may be the same as in layer 34. The particles are porous or develop a porous structure with the bonding agent, are inert to halogen and the electrolyte, and do not adsorb halogen. The edges of adsorbent layer 34 are rounded around the entire periphery of the layer, and the edges 42 of the surface layer 38 are sized so that the bromine entrapment device 32 will have a rectangular cross-section in all three perpendicular planes, presenting a flat cathode surface 44 to the electrolyte.

Each composite electrode 22 has a single electroconductive layer 46, identical to either of layers 28 and 29 of terminal cathode 14, and approximately 25 mils thick. A thin coating 50 (on the order of 10 mils) of the above-described electrically non-conductive particles is bonded to the exposed anode surface 48 of layer 46. These particles are bonded directly to the poly (vinylidene fluoride) bonding agent of electroconductive layer 46. Secured to the opposite surface of electroconductive layer 46 is a bromine entrapment structure 54 identical to the bromine entrapment structure 32 of terminal cathode 14 and therefore having an adsorbent layer 34 and a surface layer 38.

Terminal anode 18 has a copper screen 56, identical to copper screen 26 of terminal cathode 14, the major portion of which is sandwiched between two bromine inert and bromine impermeable electroconductive layers 58, 59, which are identical to the electroconductive layers 28, 29 of terminal cathode 14 and are identically bonded to one another through the openings of screen 56. The exposed anode face of electroconductive layer 58 has a thin coating 62 of the above-described electrically non-conductive particles identical to the coating 50 on the anode face 48 of composite electrode 22. Exposed portions of the electroconductive layers, and bromine adsorbent layers are coated with a thin coating 66 of a bromine-inert and substantially gas-impermeable sealer.

Although the battery shown in FIG. 1 is electrically tapped as shown only at the terminal electrodes 14 and 18, it will be understood that lesser voltages may be tapped by providing intermediate terminal-type electrodes. Such electrodes would be identical to terminal cathode 14, except for the presence of a thin coating of electrically non-conductive particles on the exposed major surface of the electroconductive layer 28, identical to the coatings 50, 62 on composite electrode 22 and terminal anode 18, respectively.

The bottom wall 91 of housing 12 has a number of upstanding ribs 92, defining therebetween grooves 94. A spacer 95 has the electroconductive layers protrudting therethrough, and sealed therein by a bromine-inert, and bromine- and liquid-impermeable epoxy resin 96. The spacer 95 has an elongated opening 97 (about 1 inch wide) for filling the battery. Screens 26, 56 and screws 15, 20 are also potted, as shown, in resin 96.

When the electrodes are secured in place, the battery is filled with electrolyte solution by vacuum impregnation, so that the bromine-adsorbent device becomes saturated with electrolyte all the way in to the electroconductive (graphite-fluorocarbon) layers. The battery is charged in the usual manner across the terminal screws 15, 20, electrolyzing the zinc bromide salt to form molecular bromine which is adsorbed by the activated carbon of the cathode and metallic zinc, which is electroplated onto the anode surfaces. During the discharge cycle, the opposite electrochemical reaction takes place, the molecular bromine returning to bromide ion and the zinc plating dissolving to zinc ions.

While the battery structure hereinabove described is preferred, other structures, for example, as described in Pat. 3,640,771, may be used.

In accordance with this invention the electrolyte is an aqueous solution of zinc bromide and zinc salt or salts which is limited in bromide ion molarity but not limited or not so limited in zinc ion molarity, which is substantially more than half the bromide ion molarity. The increase in zinc ion molarity over one-half that of the bromide ion, which it would be in an aqueous solution of zinc bromide alone, is provided by the added zinc salt or salts. As previously stated, the zinc salt or salts are soluble in the electrolyte and have an anion which is not reactive with bromine under charge or use conditions of the battery and is not oxidizable by the cathode or is more difficulty oxidizable than bromide ion at the potential reached in charging. The limitation of zinc bromide molarity is such that the bromide concentration is too low to support a complete charge at the charging rate employed although supporting the major part of the charge, and the adsorptive capacity of the adsorptive layer is such as to adsorb in excess of 0.5 gm. of molecular bromine per gm. of adsorbent and to adsorb all or nearly all the free bromine generated at the cathode.

The following examples and tables will serve to illustrate the invention, its advantages and various formulae that can be used for the electrolyte.

EXAMPLE 1

Two single cells A and B having the two electrodes of the preferred construction shown and described herein were made as nearly identical as possible. Cell A was filled with a conventional 2.8 $ZnBr_2$ aqueous solution as electrolyte. Cell B was filled with an aqueous electrolyte according to this invention which was 2.3 M in $ZnBr_2$, 0.2 M in $ZnSO_4$, and otherwise like the electrolyte of Cell A. The results of comparative tests of these cells under the same conditions are shown in Table I.

TABLE I

| Cell | Rate (amps) | Ah in | End of charge V | Rate (amps) | Ah out | Percent Ah out to Ah in |
|---|---|---|---|---|---|---|
| A | *6, 4 | 19 | 1.87 | 8 | 14.8 | 77.9 |
| B | 6, 4 | 22 | 2.06 | 8 | 16.6 | 75.5 |
| A | 6, 4 | 19 | 1.90 | 6 | 15.1 | 79.5 |
| B | 6, 4 | 21 | 2.14 | 6 | 16.6 | 79.0 |
| A | 6, 4 | 19 | 1.92 | 8 | 15.2 | 80.0 |
| B | 6, 4 | 19 | 2.15 | 8 | 16.0 | 84.2 |
| A | 6, 4 | 19 | 1.93 | 6 | 15.3 | 80.5 |
| B | 6, 4 | 18 | 2.10 | 8 | 14.7 | 81.7 |
| A | 6, 4 | 19 | 1.93 | 8 | 14.0 | 73.7 |
| B | 6, 4 | 18 | 2.12 | 6 | 15.0 | 83.3 |

*6, 4 charge rate=6 amps for 1 hour 4 amps for remainder of charge.

It will be noted that the end of charge voltage was considerably higher for Cell B with electrolyte according to the invention than it was for Cell A having a conventional electrolyte. It will also be noted that while the percent Ah out to Ah in (performance efficiency) was slightly greater in the first two tests for Cell A, it was substantially greater for Cell B in the last three tests. Also the Cell B charge acceptance (Ah in) was greater in the first two tests. The zinc plating on the anode during charge in Cell B was at least as good as that in Cell A.

Similar tests were made with two cells of the same construction as A and B, one of which, Cell C, was filled with the conventional 2.8 M $ZnBr_2$ solution used in Cell A, and the other of which, Cell D, was filled with an electrolyte according to Pat. 3,640,771 which was an aqueous solution 2.45 M in $ZnBr_2$, which included 1 gram $AlCl_3$ and 0.5 gram $AlKSO_4$ (brighteners) per 105 ml. of the solution. The results of comparative tests of these two cells are shown in Table II.

TABLE II

| Cell | Charge Rate (amps.) | Ah in | End of charge V | Discharge Rate (amps.) | Ah out | D as percent of C |
|---|---|---|---|---|---|---|
| C | 8 | 26 | 1.92 | 7.4 | 19.8 | |
| D | 8 | 26 | 2.37 | 8 | 16.8 | 84.9 |
| C | 8 | 28 | | 7.4 | 14.4 | |
| D | 8 | 28 | 2.21 | 7.4 | 11.1 | 77.1 |
| C | 8 | 28 | | 8 | 20.8 | |
| D | 8 | 28 | | 8 | 17.6 | 84.6 |
| C | 4 | 32 | 1.86 | 8 | 20.2 | |
| D | 4 | 32 | 1.96 | 8 | 16.5 | 81.7 |
| C | 8 | 32 | | 8 | 20 | |
| D | 8 | 32 | | 8 | 18.7 | 93.5 |
| Average | | | | | | 84.36 |

In those instances in which it was measured, the voltage at end of charge was substantially greater in Cell D with electrolyte according to the patent that it was in Cell C having the conventional electrolyte. However, the percentage of Ah out of Cell C was much greater than Cell D at the same Ah charge. The zinc plating on the anode of Cell D was distinctly inferior to that in Cell C in all cases.

EXAMPLE 2

Two 24-cell batteries were made as identically as possible according to the preferred construction described above. One battery was filled with a conventional aqueous electrolyte solution which was 2.78 M in $ZnBr_2$, the other with an aqueous electrolyte solution which was 1.98 M in $ZnBr_2$ and 0.60 M in $ZnSO_4$. Both electrolytes had the same minor amounts of the same additives. Table III shows comparative test results.

TABLE III

| Electrolyte | Ah in | End of charge V | Ah out | Percent Ah out to Ah in |
|---|---|---|---|---|
| 2.78 M $ZnBr_2$ | 25 | 45.0 | 16.5 | 66 |
| 1.98 M $ZnBr_2$ 0.60 M $ZnSO_4$ | 19.5 | 50.0 | 15.4 | 79 |

The low bromide molarity battery had both a substantially greater end of charge voltage and percentage Ah out to Ah in, or performance efficiency. In addition, its electrolyte temperature at end of charge was substantially lower than that of the other battery, 90° F. vs. 117° F., an additional advantage.

Figure 3:
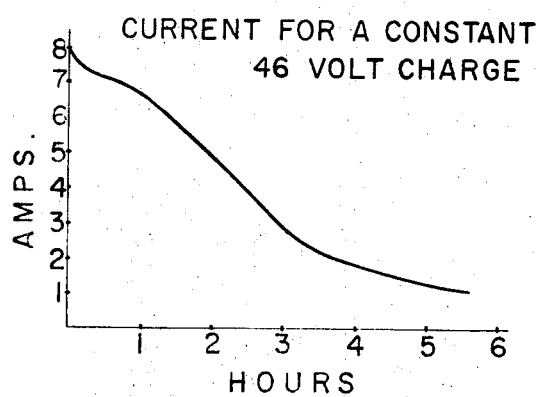
FIG. 3 is a graph showing a typical voltage inflection that occurs at the end of charge of batteries according to this invention.
Figure 2:
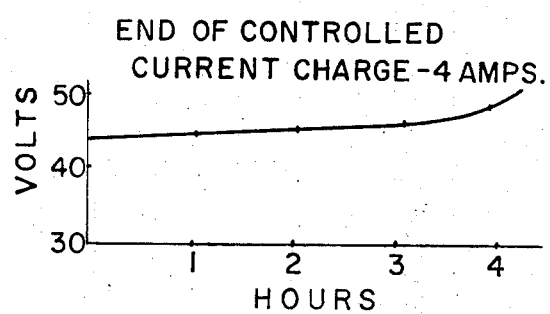
FIG. 2 is a graph showing a typical tapering charge accepted by batteries according to this invention.

FIG. 2 shows the voltage inflection that occurs near the end of a constant voltage charge in a limited molarity $ZnBr_2$ electrolyte battery with $ZnSO_4$, such as the example used in the Table III tests, which corresponds to increased resistance of the cells when the bromide ion concentration in the electrolyte becomes so depleted that the cathode potential-controlling reaction becomes water-oxidation. The inflection signaling the fully charged state may be picked up by a voltage sensing circuit and used, for example, to terminate or reduce charge current to avoid overheating. FIG. 3 shows the inherent self-limiting current acceptance of such a battery during charge, starting at 8 amps., the charge current accepted tapering to close to 1 amp. at the end of charge; whereas, the usual zinc bromide electrolyte battery accepts a constant charge current.

A series of comparative cell tests was made to determine the effects of varying the relative $ZnBr_2$ and $ZnSO_4$ molarities from those used in the battery of the Table III tests. These indicated that if the $ZnBr_2$ molarity is decreased substantially below 2 M, for example, to 1.75 M with an increase of $ZnSO_4$, for example to 1.25 M, an increase in end of charge voltage can be attained, e.g., to about 2.40–2.50 as against an average cell end of charge voltage in the battery of Table III of 2.08. However, a definite loss in efficiency, percent Ah out to Ah in, is normally experienced, so that it may be no better than or even poorer than that of the other battery used in the Table III tests. Increases of $ZnBr_2$ normality above 2 M toward the usual 2.75–3 M level while correspondingly reducing the $ZnSO_4$, reduces the end of charge voltage while either not substantially improving or actually reducing the efficiency. The relative normalities of $ZnBr_2$ and $ZnSO_4$ of the electrolyte of the battery used for the Table III tests therefore appear to be a good compromise between maximum end of charge voltage and maximum efficiency.

In general, the amount of zinc salt added wash such as to provide a zinc ion concentration at least about that of a 2.5 M–3 M $ZnBr_2$ aqueous solution.

EXAMPLES 4–8

In the tests shown in Table IV, like Cells E–J were filled with the electrolytes indicated and tested for information as to relative effectiveness of zinc salts other than $ZnSO_4$.

TABLE IV

| Cell | Electrolyte | No. tests | Ah in | End of charge V | Ah out |
|---|---|---|---|---|---|
| E | 2.3 M $ZnBr_2$, .3 M Zn trifluoroacetate. | 3 | 18.8 | 2.07 | 13.82 |
| F | 2.3 M $ZnBr_2$ .2 M $ZnSO_4$, .3 M Zn trifluoroacetate. | 4 | 17 | 2.23 | 13.36 |
| G | 2.3 M $ZnBr_2$, .5 M Zn acetate, .5 M Na acetate. | 4 | 16.5 | 2.29 | 11.25 |
| H | 2.3 M $ZnBr_2$. 5M Zn acetate | 4 | 16.5 | 2.15 | 11.70 |
| I | 1.6 M $ZnBr_2$, .3 M $ZnSO_4$, .3 M Zn trifluoroacetate. | 3 | 13.7 | 2.10 | 9.24 |
| J | 2.2 M $ZnBr_2$, .6 M $ZnCl_2$, 1.0 M $NH_4Cl$. | 7 | 15.7 | 2.18 | 11.81 |

It should be noted that the addition of 0.2 M $ZnSO_4$ in Cell F improved the performance of Cell F over Cell E both as to end of charge voltage (2.23 vs. 2.07) and efficiency (78% vs. 73%). However, Cell G was similar, with 0.5 M zinc acetate and 0.5 M sodium acetate substituted for the zinc sulfate and 0.3 M zinc acetate of Cell E. In general, the nature of the zinc salt used, provided it has the necessary characteristics indicated above, is not too important, although zinc sulfate or zinc chloride are presently preferred choices. Again the amount of additional zinc salt was such as to provide at least as much zinc ion as contained in an aqueous solution of 2.5-3 M $ZnBr_2$.

It should be borne in mind that the bromide concentration used bears a relation to the specific cell construction, in particular to the capacity of the cathode in relation to the volume of the electrolyte as well as to the charge rate employed. In general, higher solution volume to cathode capacity calls for less bromide concentration in the electrolyte and a lower charge rate. However, while the exact bromide concentration used may vary considerably according to such factors, it should always be in amount which will support the major part but not all of the charge and is substantially less than twice the amount of zinc ion.

What is claimed is:

1. A battery comprising an anode, a cathode and an aqueous electrolyte solution of zinc bromide and additional zinc ion provided by at least one additional zinc salt dissolved in said electrolyte, each said salt having an anion which is non-reactive with bromide and essentially non-oxidizable at the cathode potential under operating conditions of said battery, said cathode having a bromine-adsorptive layer capable of adsorbing at least substantially all of the bromine produced by oxidation of bromide ion at the cathode during charge of said battery, the amount of bromide ion in said electrolyte being substantially less than twice the amount of zinc ion therein and sufficient to support the major part of the charge of, but insufficient to support complete charge of, the battery by bromide oxidation at the cathode, so that near the end of charge the cathode potential-controlling reaction ceases to be oxidation of bromide ion and requires a higher anodic potential.

2. A battery according to claim 1 wherein the zinc ion provided by said additional zinc salt improves the zinc plating on the anode at the end of charge to at least substantially equal that which would be obtained if the zinc bromide concentration were sufficient to support complete charge of the battery by bromide oxidation at the cathode.

3. A battery according to claim 1 wherein said electrolyte has less bromide ion than a 2.5 M aqueous solution of zinc bromide.

4. A battery according to claim 3 wherein the amount of zinc ion in the electrolyte is at least about equal to the zinc ion present in a 2.5-3 M aqueous solution of zinc bromide.

5. A battery according to claim 1 wherein said at least one additional zinc salt includes zinc sulfate.

6. A battery according to claim 1 wherein said at least one additional zinc salt includes zinc chloride.

7. A battery according to claim 1 wherein the battery voltage increases substantially near the end of a constant voltage charge.

8. A battery according to claim 7 wherein said voltage increase is at least of the order of about 0.2 volt per cell.

9. A battery according to claim 1 wherein the fully charged voltage is at least of the order of about 2.08 volts per cell.

10. A battery according to claim 1 in which the amperes of current accepted at a constant voltage charge reduce as the charge progresses to a low level at end of charge.

References Cited

UNITED STATES PATENTS

| 3,328,202 | 6/1967 | Riffe | 136—30 X |
| 3,382,102 | 5/1968 | Zito, Jr. | 136—30 |
| 3,408,232 | 10/1968 | Blue et al. | 136—155 X |
| 3,578,503 | 5/1971 | Bloch et al. | 136—102 |
| 3,640,771 | 2/1972 | Zito, Jr. | 136—6 R |
| 3,642,538 | 2/1972 | Zito, Jr. | 136—30 X |
| 3,682,703 | 8/1972 | Smith | 136—6 R |

ANTHONY SKAPARS, Primary Examiner

U.S. Cl. X.R.

136—30, 155